US007251455B1

(12) United States Patent
Mower et al.

(10) Patent No.: US 7,251,455 B1
(45) Date of Patent: Jul. 31, 2007

(54) TECHNIQUES FOR ANTENNA TRACKING

(75) Inventors: Vaughn Lee Mower, Bountiful, UT (US); Roy Fletcher Lunsford, Syracuse, UT (US); Ryan Clark Beard, Bountiful, UT (US); Jeffrey Craig Wright, Woods Cross, UT (US)

(73) Assignee: L-3 Communications Corporation, New York, NY (US)

( * ) Notice: Subject to any disclaimer, the term of this patent is extended or adjusted under 35 U.S.C. 154(b) by 63 days.

(21) Appl. No.: 11/178,861

(22) Filed: Jul. 11, 2005

(51) Int. Cl.
*H04B 15/00* (2006.01)
*H04B 7/14* (2006.01)
*H04M 1/00* (2006.01)

(52) U.S. Cl. .................... 455/63.4; 455/25; 455/562.1; 455/575.7; 455/63.1

(58) Field of Classification Search ............... 455/63.4, 455/87, 562.1, 575.7, 575.9, 107, 121, 129, 455/82–83, 193.1, 194.2, 95–99, 63.1, 67.13, 455/25, 68, 71, 570, 127.3, 232.1, 403; 343/703, 343/705, 778, 700 R, 708, 710, 714; 375/130, 375/140, 304; 342/147–148, 151, 402, 153–155, 342/157–158, 359–361, 385–386, 419, 424, 342/426–430, 432–433, 449–450, 357.07–357.17, 342/74–76, 95–96, 422; 370/339; 340/539.21, 340/539.13
See application file for complete search history.

(56) References Cited

U.S. PATENT DOCUMENTS 5,859,842 A * 1/1999 Scott .......................... 370/342
6,033,462 A * 3/2000 Dekker et al. ................ 95/248
6,061,339 A * 5/2000 Nieczyporowicz et al. . 370/335
6,108,561 A * 8/2000 Mallinckrodt ............... 455/522
6,337,658 B1 * 1/2002 Tong et al. ................. 342/359
6,433,736 B1 * 8/2002 Timothy et al. ............ 342/359
6,459,410 B1 * 10/2002 Pulsipher et al. ........... 342/428
7,103,386 B2 * 9/2006 Hoffmann et al. ....... 455/562.1
2003/0152086 A1 * 8/2003 El Batt ....................... 370/400
2004/0009794 A1 * 1/2004 Proctor et al. ........... 455/575.7
2006/0012521 A1 * 1/2006 Small ......................... 342/386

* cited by examiner

*Primary Examiner*—Meless Zewdu
(74) *Attorney, Agent, or Firm*—Harrington & Smith, PC

(57) ABSTRACT

A method estimates a signal to noise ratio (SNR) of a received direct sequence spread spectrum (DSSS) signal. Using the estimated SNR, a control signal is determined that is suitable for modifying a position of a directional antenna. The control signal may be used to modify the position of the directional antenna. In another method, a first estimated SNR is determined for a received radio frequency (RF) signal. An output voltage of an AGC circuit is converted to a second estimated SNR. Using at least the first estimated SNR when the first estimated SNR is within a first range and using at least the second estimated SNR when the second estimated SNR is within a second range, an output SNR is determined. The output SNR may be used to determine the at least one control signal, which may then be used to modify the position of the directional antenna.

26 Claims, 9 Drawing Sheets

TECHNIQUES FOR ANTENNA TRACKING

TECHNICAL FIELD

This invention relates generally to radio frequency communication and, more specifically, relates to antenna tracking of radio frequency (RF) signals.

BACKGROUND OF THE INVENTION

Communications systems exist that can use directional antennas to track a transmit terminal transmitting a radio frequency (RF) signal as part of a data link between the transmit terminal and a receive terminal. A directional antenna can be adjusted about one or more axes. When a transmission terminal (e.g., a satellite or transmitting tower) is in a relatively fixed position and a directional antenna is also in a relatively fixed position, then open-loop pointing of the directional antenna may be used.

Open-loop antenna pointing techniques are extremely useful and cost effective if the subject antenna mounting position and mounting base are known precisely, thus not requiring an antenna tracking feedback system. These techniques are therefore useful if the cumulative pointing errors are much smaller than the antenna bandwidth, providing acceptable pointing losses.

There are times when an antenna is mounted on a mobile platform, such as when the transmission terminal is disposed in an aircraft or satellite. Open-loop antenna pointing techniques do not have feedback and therefore tend not to function well when one or more of the antenna or transmission terminal is moving. In this situation, closed-loop antenna pointing techniques are typically used to allow a directional antenna to track an opposing transmission or reception terminal.

With regard to closed-loop pointing techniques, most closed loop pointing systems rely on signal strength indication from automatic gain control (AGC) loops to provide closed-loop error feedback to an antenna servo control loop. The antenna servo control loop then controls the directional antenna to track the transmission terminal.

While closed-loop antenna pointing techniques are beneficial, these techniques can also be relatively expensive and may be limited in certain areas. Thus, it would be beneficial to provide improvements to antenna tracking using pointing techniques such as open-loop or closed-loop antenna pointing.

BRIEF SUMMARY OF THE INVENTION

The foregoing and other problems are overcome, and other advantages are realized, in accordance with exemplary embodiments of these teachings. In particular, the present invention provides techniques for antenna tracking.

For instance, an exemplary technique comprises a method that estimates a signal to noise ratio (SNR) of a received direct sequence spread spectrum (DSSS) signal. Using the estimated SNR, at least one control signal is determined that is suitable for modifying a position of a directional antenna. The at least one control signal may be used to modify the position of the directional antenna.

In another exemplary technique, a method comprises determining a first estimated SNR of a received radio frequency (RF) signal. An output voltage of an AGC circuit coupled to the received RF signal is converted to a second estimated SNR. Using at least the first estimated SNR when the first estimated SNR is within a first range and using at least the second estimated SNR when the second estimated SNR is within a second range, an output SNR is determined. The output SNR is suitable to use to determine at least one control signal suitable to modify a position of a directional antenna. Consequently, the output SNR may be used to determine the at least one control signal, which may then be used to modify the position of the directional antenna.

In another exemplary embodiment, an apparatus is disclosed that comprises a circuit that determines a first estimated SNR of a radio frequency (RF) signal. The apparatus also comprises a circuit that converts an output voltage of an automatic gain control (AGC) circuit coupled to the RF signal to a second estimated SNR. The apparatus additionally comprises a circuit that determines an output SNR using at least the first estimated SNR when the first estimated SNR is within a first range and using at least the second estimated SNR when the second estimated SNR is within a second range, the output SNR suitable to use to determine at least one control signal suitable to modify a position of a directional antenna.

In another exemplary embodiment, an apparatus comprises means for determining a first estimated SNR of a received RF signal and means for converting an output voltage of an AGC circuit coupled to the received RF signal to a second estimated SNR. The apparatus also comprises means for determining an output SNR using at least the first estimated SNR when the first estimated SNR is within a first range and using at least the second estimated SNR when the second estimated SNR is within a second range.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

Figure 1:
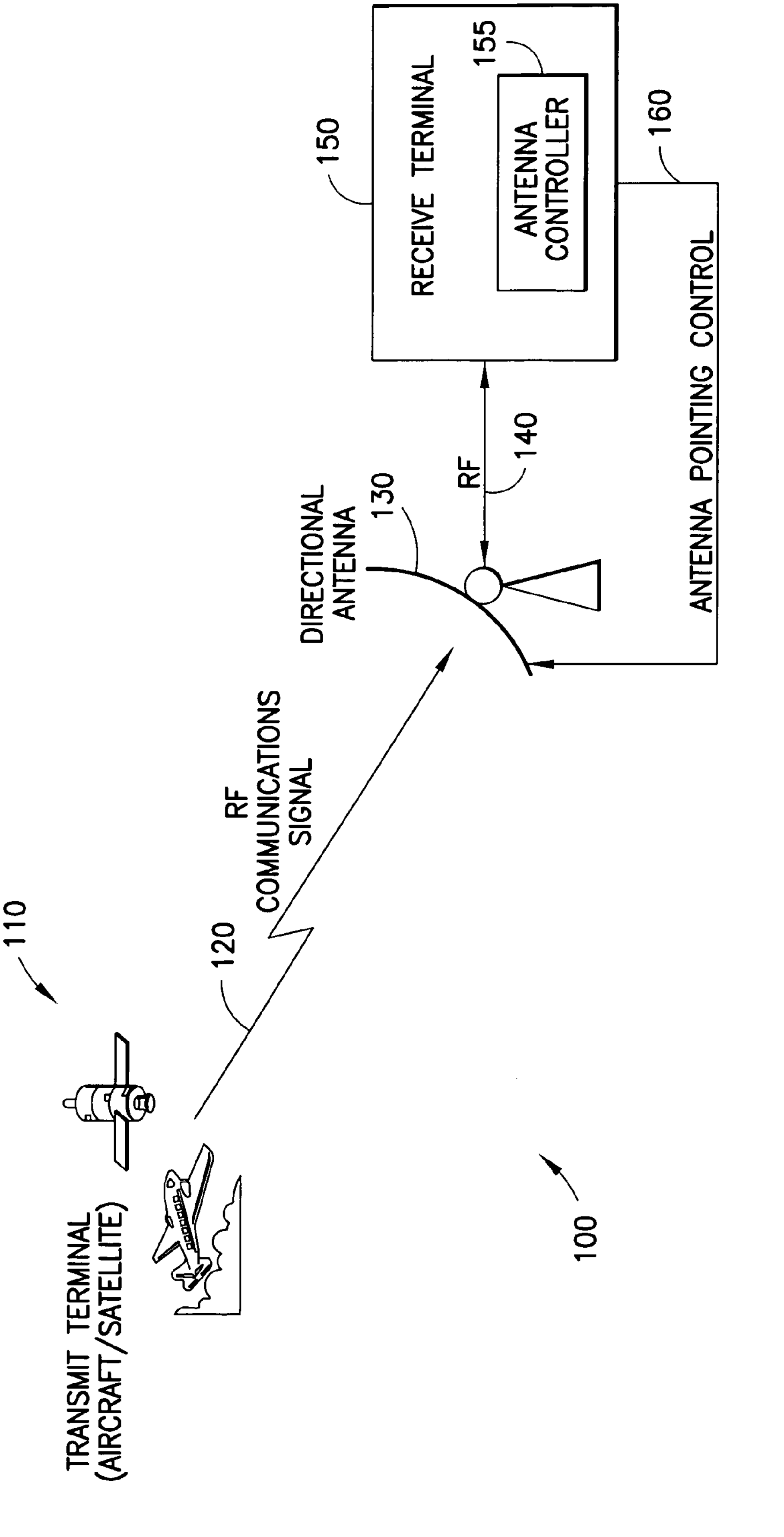
FIG. 1 is a block diagram of an exemplary communications system with a directional antenna used for tracking a radio frequency (RF) signal.

As described above, one technique used for antenna pointing is closed-loop pointing. Closed-loop pointing techniques include automatic gain control (AGC) loops to provide closed-loop error feedback to an antenna servo control loop. One problem with AGC loops is that an AGC does not produce very high output voltages for signals such as spread spectrum (SS) signals, and thus AGC loops tend to be of little or no use with SS signals. Another type of closed-loop antenna pointing that allows a directional antenna to track a transmit terminal comprises self-scan tracking techniques described by inventors L. Timothy, M. Ownby, and D. Bowen, in U.S. Pat. No. 6,433,736, assigned to L-3 Communications, and entitled "Method and Apparatus for an Improved Antenna Tracking System Mounted on an Unstable Platform," the disclosure of which is hereby incorporated by reference. The techniques described in U.S. Pat. No. 6,433,736 are proven for satellite tracking applications, have been implemented to use automatic gain control (AGC) feedback, and are generally used for signals having positive signal-to-noise ratio (SNR) in the receive bandwidth in which the signal occupies. In the techniques described in U.S. Pat. No. 6,433,736, the AGC feedback is used as an error signal during tracking.

While the techniques in U.S. Pat. No. 6,433,736 have been proven to be beneficial, it is desirable to improve further on these techniques. Aspects of the present invention improve on the techniques in U.S. Pat. No. 6,433,736 by providing, in an exemplary embodiment, methods and systems for performing antenna tracking with a direct sequence spread spectrum (DSSS) signals. In the case of DSSS, due to the wideband nature of this signaling technique, the signal level of the received DSSS signal is generally well below a thermal noise floor of a receiver, thus making self-scan tracking techniques such as those disclosed in U.S. Pat. No. 6,433,736 that use AGC error signals generally unsuitable.

In certain embodiments herein, the applicability of the self-scan tracking techniques in U.S. Pat. No. 6,433,736 is modified to operate with DSSS signals that have negative SNRs in the receive bandwidth. One exemplary way of modifying the self-scan tracking techniques is to apply methods for estimating an SNR in de-spread DSSS signals, as described in U.S. Pat. No. 6,061,339, by inventors L. Nieczyporowicz, T. Giallorenzi, P. Stephenson, and R. Sylvester, assigned to L-3 Communications Corporation, and entitled "Fixed Wireless Loop System Having Adaptive System Capacity Based on Estimated Signal to Noise Ratio," the disclosure of which is hereby incorporated by reference. The methods in U.S. Pat. No. 6,061,339 may be used to determine an estimated SNR following de-spreading (e.g., DSSS correlation performed by a correlation receiver) of the DSSS signal and using techniques provided herein to supply an error signal (e.g., estimated $SNR_d$ signal 245) used for antenna tracking.

Certain embodiments of the present invention may be applied through software without the need of any additional hardware other than the hardware already necessary to perform antenna pointing and tracking. Additionally, certain exemplary tracking methods described herein apply to surface and airborne antenna systems, where precise pointing direction of the antenna cannot be controlled due to uncertainties in the terminal location, uncertainties in the antenna mounting reference on the platform or surface of the Earth, or both. Additional exemplary embodiments can apply to a portable (e.g., mobile) surface antenna that is automatically geo-located using either a survey or global positioning satellite (GPS) system. Other uncertainties in these types of applications are inclinometer (e.g., antenna-based leveling) inaccuracies, magnetic compass (e.g., antenna azimuth orientation) inaccuracies, or both, which require an antenna tracking system to resolve these uncertainties. Certain embodiments of the present invention may also deal with inclinometer and magnetic compass inaccuracies.

Turning now to FIG. 1, a communications system 100 is shown. Communications system 100 comprises a data link comprising an RF signal 120 from a transmit terminal 110 whose exact position is not necessarily known a priori by the intended receive terminal 150. The receive terminal 150 may be, for instance, airborne or ground-based. The transmit terminal 110 may also be, illustratively, airborne (e.g., aircraft), space-based (e.g., satellite), or ground-based. In any case, the antenna system of the receive terminal 150 is directional in nature to provide sufficient antenna gain to acquire the RF signal 120. Thus, the antenna system of the receive terminal 150 comprises a directional antenna 130, antenna controller 155, antenna pointing control 160, and received RF signal 140.

Since the bandwidth received by the directional antenna 130 decreases with increased antenna gain, the receive terminal 150 performs a spatial search to locate the transmit terminal 110 and to receive the RF signal 120 (e.g., within a main beam received by the directional antenna 130). Once the RF signal 120 is acquired, the receive terminal 150 automatically (e.g., using the antenna controller 155 and antenna pointing control 160) points the directional antenna 130 at the transmit terminal 110 location either by pointing the directional antenna 130 at coordinates (e.g., latitude, longitude, and altitude) of the transmit terminal 110 or by using an antenna tracking scheme that automatically positions the directional antenna 130 at the highest signal strength in the received RF signal 140. If the automatic tracking method is used, the information required to point (e.g., using the antenna pointing control 160) the directional antenna 130 at the position of the transmit terminal 110 should be extracted from demodulated data (not shown in FIG. 1).

For an exemplary embodiment herein, the RF signal 120 from the transmit terminal 110 is formed using DSSS techniques. The transmitted signal strength may be near a threshold for receive terminals 150 that are located far from the transmit terminal 110, or may be low due to jamming (hostile or inadvertent) in the received DSSS frequency band. Thus, the tracking system operated by the antenna control 155 should and does, in an exemplary embodiment, function for the case of low SNR and high SNR in the receive bandwidth.

Figures 1, 2A:
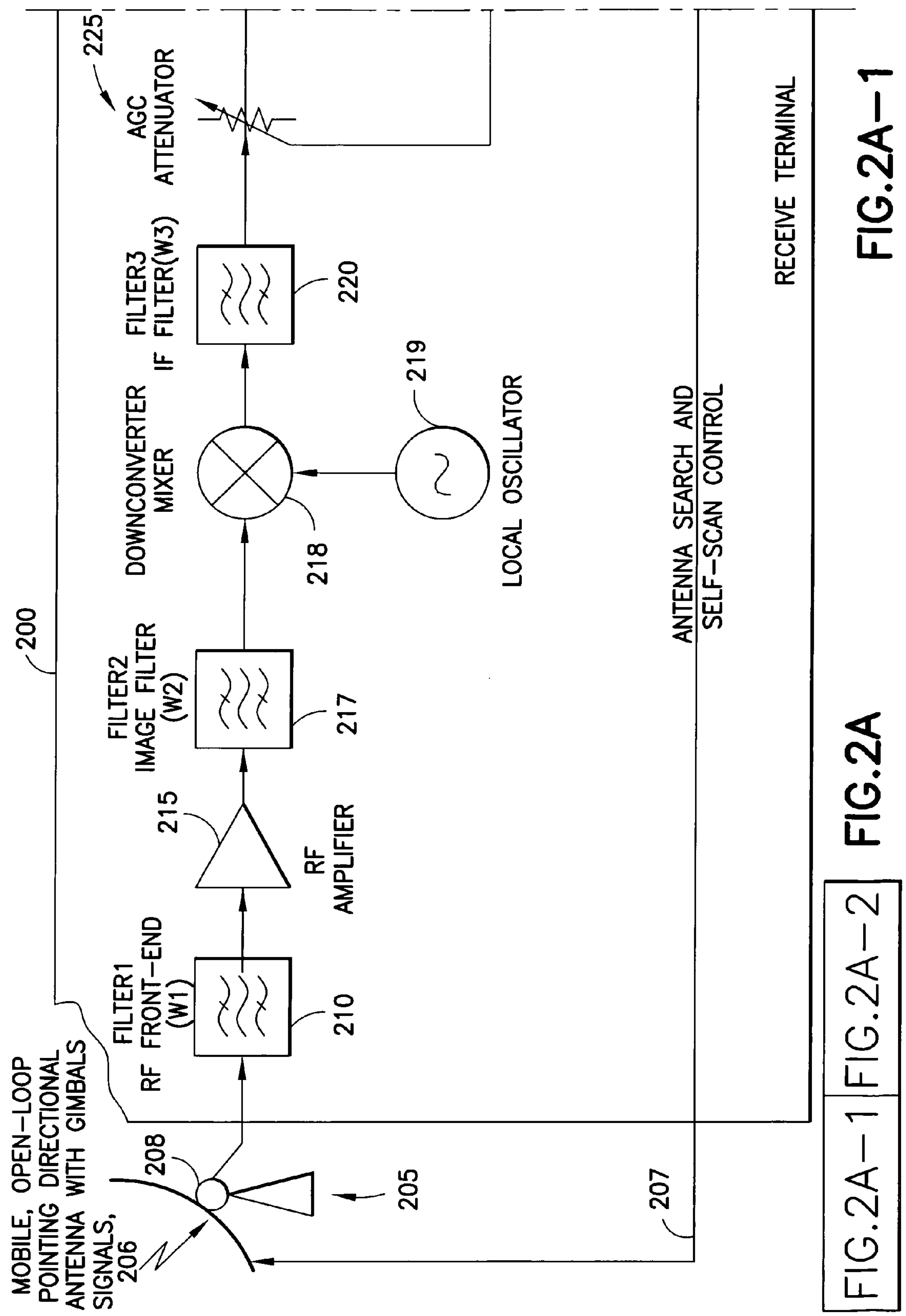
Figures 2, 2A:
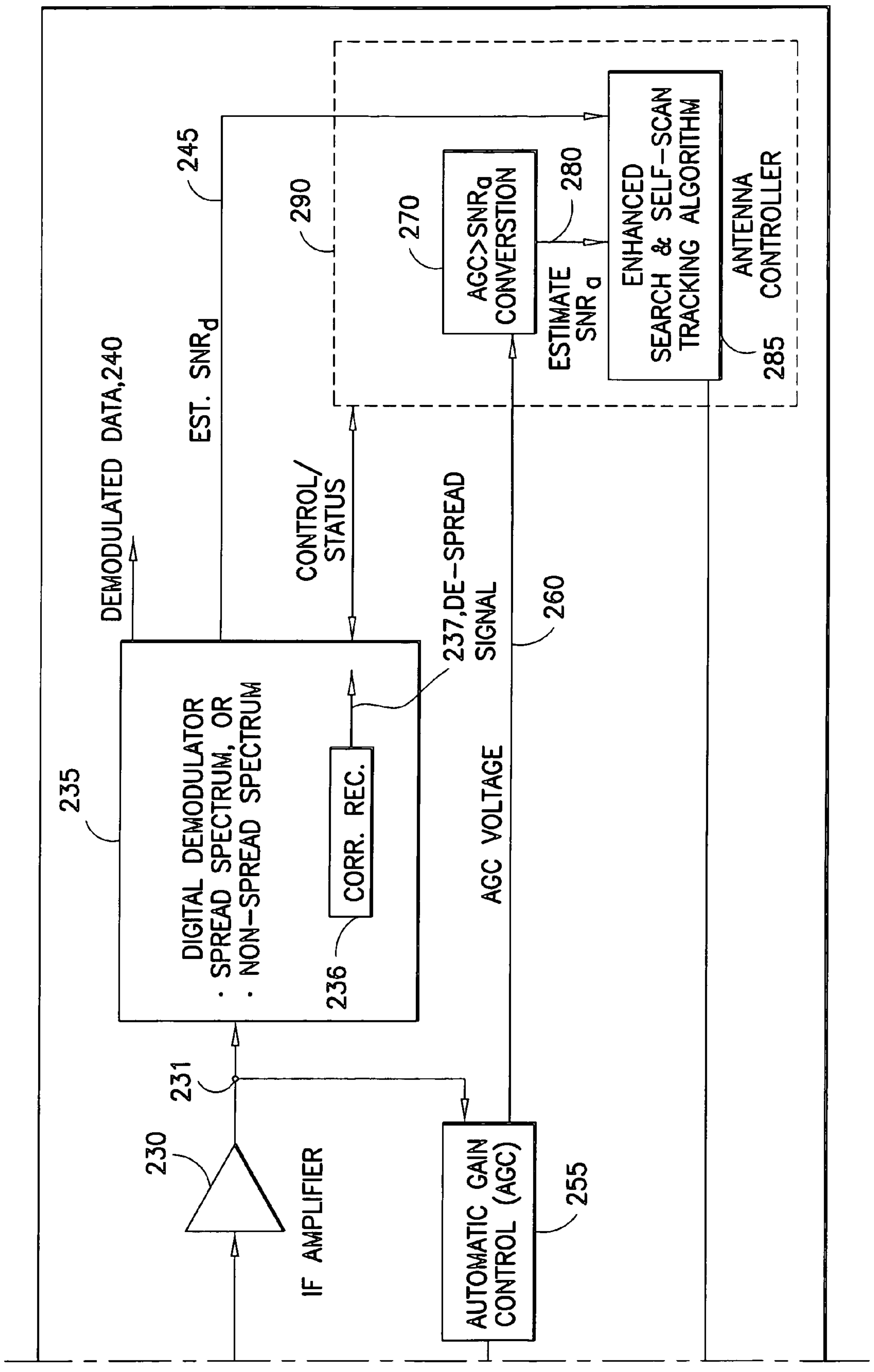
FIG. 2 includes, in FIG. 2A, a block diagram of a receive terminal with enhanced self-scan tracking, interoperating with a directional antenna, and in FIG. 2B, a block diagram of a portion of an antenna controller, in accordance with exemplary embodiments of the present invention.
Figure 2B:
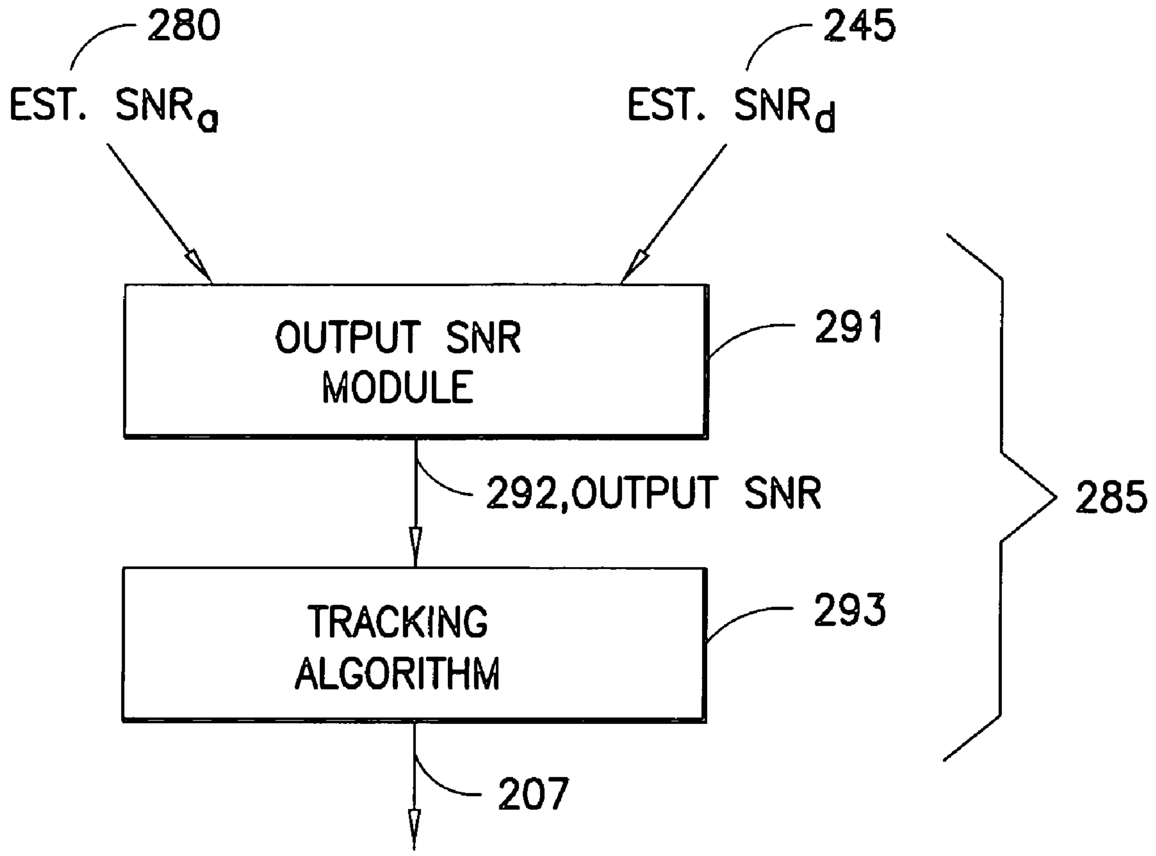

Referring now to FIG. 2, a block diagram of an exemplary receive terminal 200 is shown in FIG. 2A and in FIG. 2B, a block diagram of an antenna controller is shown. The receive terminal 200 may be implemented using one or more circuits, where each circuit comprises one or more processors (e.g., digital signal processors), one or more memories, one or more logic arrays such as field programmable gate arrays, one or more semiconductor chips, software, or some combination thereof. The present invention may also be implemented as a signal bearing medium tangibly embodying a program of machine-readable instructions executable by a circuit to perform operations described herein. Receive terminal 200 utilizes a directional antenna 205 to receive a signal S 206 that occupies RF bandwidth W1. The signal S 206 (e.g., after amplification by directional antenna 205) is filtered using filter 210 with an RF bandwidth (e.g., W1) sufficiently wide to receive the signal S 206. The signal S 206 is generally amplified using a low noise amplifier (LNA), shown as RF amplifier 215, then filtered using filter 217 (with RF bandwidth W2) to suppress undesired image noise that would otherwise degrade the receiver sensitivity. The RF amplifier 215 and filter 217 are optional for some applications, as are other devices in the receive terminal 200.

The signal S 206 is next downconverted to an intermediate frequency (IF) by using the downconverter mixer 218 and local oscillator 219. The signal S 206 is filtered using filter 220 (with RF bandwidth of W3) and then conditioned using an automatic gain control (AGC) circuit 255 with associated amplifiers 230 and attenuators 225 to provide a constant signal plus noise (S plus N) power at the input to the digital demodulator 235. For an exemplary application where the signal S 206 is DSSS, the RF bandwidth W3 (also called the receive RF bandwidth W3 herein) of the filter 220 should be sufficiently wide to pass the received DSSS signal. As a result, the SNR at point 231 (e.g., the SNR in the receive RF bandwidth W3), prior to the digital demodulator 235, is generally negative for DSSS signals, although the SNR at point 231 may be large when the transmit terminal (e.g., transmit terminal 110 shown in FIG. 1) is located close by the receive terminal 200. In an exemplary embodiment, the antenna controller 290 performs automatic closed-loop tracking for both situations of negative SNR in the receive RF bandwidth W3 or positive SNR in the receive RF bandwidth W3, as will be discussed in detail later. The digital demodulator 235 produces demodulated data 240 and an estimated $SNR_d$ signal 245. The digital demodulator comprises a correlation receiver 236 that is useful in determining the estimated $SNR_d$ signal 245. The correlation receiver produces a de-spread signal 237, which is used by the demodulator 235 to produce demodulated data 240.

In an exemplary embodiment, the antenna controller 290 comprises an AGC to $SNR_a$ conversion module 270 and an enhanced search and self-scan tracking algorithm module 285. The measured inputs to the enhanced search and self-scan tracking algorithm module 285 are an estimated $SNR_a$ signal 280 and an estimated $SNR_d$ signal 245. The enhanced search and self-scan tracking algorithm module 285 produces an antenna search and self-scan control signal (s) 207 suitable for modifying the position of the antenna 205. The antenna search and self-scan control signal(s) 207 can comprise any information suitable for modifying the position of the antenna 205. For instance, the antenna search and self-scan control signal(s) 207 could comprise one or more signals, such as voltages or commands, used to modify, e.g., the elevation and azimuth gimbals 208 of the antenna 205. The estimated $SNR_a$ signal 280 comprises an SNR measurement metric derived from the measured AGC output voltage 260, as will be explained later.

The estimated $SNR_d$ signal 245 comprises an SNR measurement metric derived from the signal S 206 after despreading has been performed (e.g., where the SNR measurement is estimated after a correlation receiver 236 of the digital demodulator 235 has de-spread the signal S 206 to create the de-spread signal 237). One way of determining the estimated $SNR_d$ signal 245 is to use the techniques described in U.S. Pat. No. 6,061,339, already incorporated by reference above. It should be noted that the estimated $SNR_d$ signal 245 has measurement limitations when the signal strength of signal S 206 is very large, thus resulting in a very high value for estimated $SNR_d$ signal 245. For instance, it is typically impractical to measure SNRs for the estimated $SNR_d$ signal 245 larger than on the order of 20-25 dB using digital sampling and measuring techniques that rely on analog-to-digital converters having usually 8-bits of resolution. Also, the measurement of the estimated $SNR_d$ signal 245 includes SNR degradation due to signal imperfections including untracked carrier phase noise. As a result, for signals S 206 having very large SNRs (e.g., particularly in the receive RF bandwidth W3), it is also desirable during antenna tracking to use the estimated $SNR_a$ signal 280, derived from the measured AGC output voltage 260, which is useful for very high received SNRs.

In an exemplary embodiment, the estimated $SNR_d$ signal 245 is most useful for tracking low level received signals S 206 (e.g., signals S 206 having SNRs in the receive RF bandwidth W3 below a certain threshold SNR in the receive bandwidth W3, typically an SNR near zero or a negative SNR) where the estimated $SNR_a$ signal 280 is less useful or not useful. Likewise, the estimated $SNR_a$ signal 280 is useful for higher level received signals (e.g., signals S 206 having SNRs above the certain threshold SNR) where the estimated $SNR_d$ signal 245 is generally not useful due to aforementioned difficulties of accurately measuring high SNRs in the receive RF bandwidth W3.

The self-scan tracking algorithm that performs the antenna point calculations to position the antenna azimuth and elevation gimbals 208 for directional antenna 205 to optimally point the directional antenna 205 at the target terminal (e.g., target terminal 110 of FIG. 1) is described in U.S. Pat. No. 6,433,736, already incorporated by reference above. However, the self-scan tracking algorithm in the enhanced search and self-scan tracking algorithm module 285 has been modified and improved over the self-scan tracking algorithm described in U.S. Pat. No. 6,433,736. In one exemplary embodiment, the modification and improvement comprise using the estimated $SNR_d$ signal 245 during antenna tracking to enable low SNR signals S 206 in the receive RF bandwidth W3, such as DSSS signals, to be tracked. In another embodiment, the enhancement comprises antenna tracking that uses one or more of the estimated $SNR_d$ signal 245 and the estimated $SNR_a$ signal 280. Certain exemplary embodiments herein are suitable for use with both DSSS and non-spread signals. For instance, the estimated $SNR_d$ signal 245 may be used to improve antenna tracking because of improved SNR range for non-spread signals over which the antenna tracking may operate.

In the example of FIG. 2A, the enhanced search and self-scan tracking algorithm module 285 is typically modified from that described in U.S. Pat. No. 6,433,736, as the enhanced search and self-scan tracking algorithm module 285 uses the estimated $SNR_d$ signal 245 and the estimated $SNR_a$ signal 280, through techniques described below, to produce one or more signals (e.g., antenna search and self-scan control signal(s) 207) suitable for modifying a position of the directional antenna 205. In the example shown in FIG. 2B, an output SNR module 291 produces an output SNR 292 using the estimated $SNR_d$ signal 245 and the estimated $SNR_a$ signal 280. The output SNR 292 is then passed to a search and self-scan tracking algorithm module 293, such as that described in U.S. Pat. No. 6,433,736. In the example of FIG. 2B, there may be no need to modify the search and self-scan tracking algorithm described in U.S. Pat. No. 6,433,736. The output SNR 292 may be determined as described in reference to FIGS. 3-7.

The receive terminal 200 may be implemented in a number of ways. For instance, the digital demodulator 235 could be implemented as a circuit comprising a field programmable gate array (FPGA), while the antenna controller 290 could be implemented as a circuit comprising a digital signal processor (DSP) and appropriate software. As another example, the digital demodulator 235 and the antenna controller 290 could be combined into a single circuit. The blocks in FIG. 2 are shown as representing circuits, but the blocks are merely exemplary and may be combined (e.g., two circuits combined into one circuit) or further subdivided (e.g., one circuit subdivided into two circuits).

Figure 3:
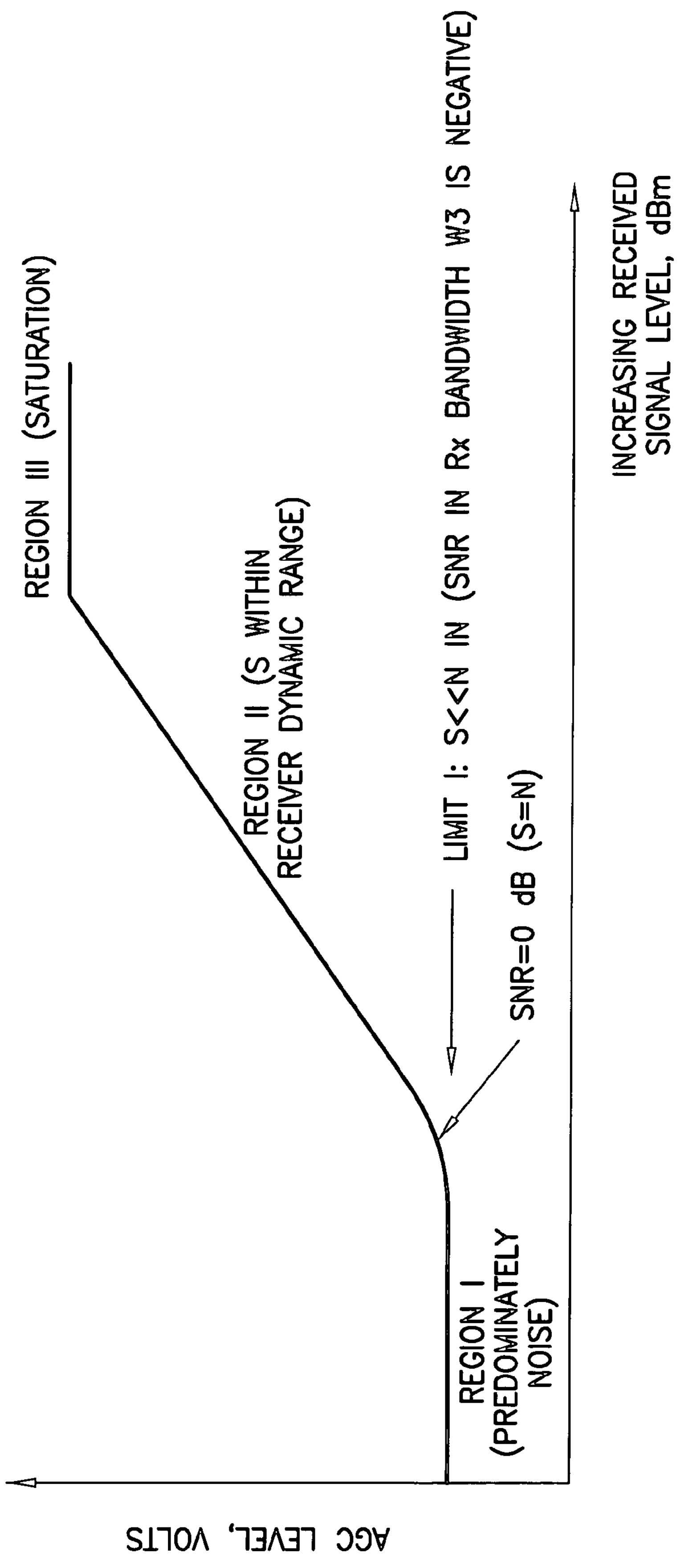
FIG. 3 is a graph of a typical automatic gain control (AGC) voltage versus received signal level.

Referring now to FIG. 3 with appropriate reference to FIG. 2, a graph is shown of a typical automatic gain control (AGC) output voltage 260 versus received signal level, in decibels-milliwatts. The example in FIG. 3 shows an AGC output voltage 260 that increases monotonically in certain ranges with increased received signal level (e.g., level of signal S 206). At lower signal levels (e.g., Region I), the AGC operates on thermal noise of the receiver. At these levels, a signal S 206 is "buried" in the noise and is not detected by the AGC. A DSSS signal S 206, for instance, may have signal levels in Region I. As a result, the AGC output voltage 260 is generally not useful for a self-scan tracking algorithm (e.g., as described in U.S. Pat. No. 6,433,736 and implemented in the enhanced search and self-scan tracking algorithm module 285).

As the received signal A 206 level increases in SNR in the receive RF bandwidth W3, the AGC will begin to detect the signal S 206 (e.g., such as a DSSS signal) and will begin to increase AGC output voltage 260 as the AGC controls the output of the IF amplifier 230. The break point between Region I and Region II on the diagram of FIG. 3 generally occurs when the S and N levels are comparable. As the received signal S 206 level increases and is large compared to N (i.e., large SNR in receive RF bandwidth W3), the AGC is captured by the signal S 206. This means that the signal power is large when compared with the noise power. In this case, only the signal power affects the AGC circuit 255 since the noise power is negligible in comparison. In Region II, the AGC output voltage 260 is of suitable values to be useful by the enhanced search and self-scan tracking algorithm module 285. Eventually, if the signal level continues to increase, the AGC output voltage 260 will saturate due to gain control in the AGC attenuator(s) 225. This region is shown as Region III on the diagram of FIG. 3. Region III is avoided by limiting the input signal S 206 to the receiver to acceptable design limits of the receive terminal 200.

For purposes of the present invention, it is immaterial if the AGC output voltage 260 is positive or negative, or whether the AGC output voltage 260 shown in FIG. 3 is linear or nonlinear. What is important is that the AGC output voltage 260 can be converted in the AGC to $SNR_a$ conversion module 270 of the antenna controller 290 to provide an estimated $SNR_a$ signal 280 to the enhanced search and self-scan tracking algorithm module 285. Conversion may comprise scaling and sign inversion that may be, for instance, performed in software with no additional recurring cost to an exemplary implementation. The conversion is discussed later.

Figure 4:
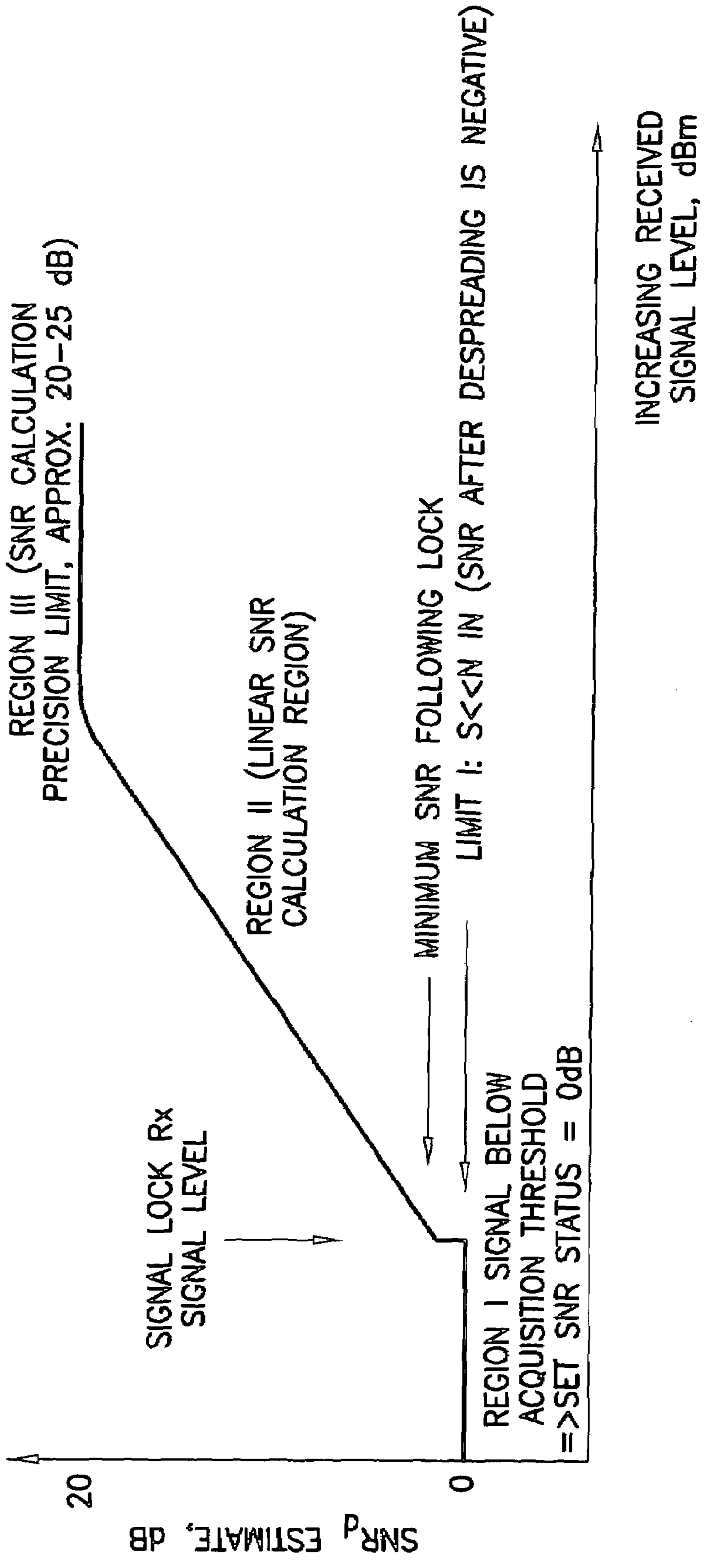
FIG. 4 is a graph of a digital demodulator estimated signal to noise (SNR) signal versus received signal level of a de-spread signal.

Refer to FIG. 4 for a graph of an exemplary digital demodulator estimated $SNR_d$ signal 245 versus received signal level after de-spreading has been performed. Examples of techniques for determining values for estimated $SNR_d$ signals 245 are described in U.S. Pat. No. 6,061,339, already incorporated by reference above. Since an SNR measurement usually cannot be made until signal acquisition occurs, the estimated $SNR_d$ signal 245 may be arbitrarily set equal to zero until lock detection occurs. This level is convenient for an exemplary embodiment, although other arbitrary levels during the non-locked condition may equally well be selected. Once lock detect occurs, the values for the estimated $SNR_d$ signal 245 will increase in a step fashion as illustrated. The minimum value for the estimated $SNR_d$ signal 245 during threshold lock conditions is generally on the order of 0-3 dB, depending on many factors that need not be discussed herein. Needless to say, the estimated $SNR_d$ signal 245 metric has little or no benefit until signal detection occurs. Following signal detection, the estimated $SNR_d$ signal 245 output provides a near-linear measurement of the SNR in the receive bandwidth W3 of the de-spread DSSS signal (e.g., signal S 206) following lock. This estimated $SNR_d$ signal 245 is used for signal levels of a signal S 206 that are below levels where the AGC response of FIG. 3 is no longer beneficial and is provided to the enhanced search and self-scan tracking algorithm module 285.

Generally, in all applications (DSSS signal or non-spread signals), the estimated $SNR_d$ signal 245 is the primary signal strength measurement metric for the enhanced self-scan tracking algorithm in the enhanced search and self-scan tracking algorithm module 285. For signals S 206 having large input SNRs in the receive RF bandwidth W3 where the estimated $SNR_d$ signal 245 is in the Region III of FIG. 4, the AGC level response shown in FIG. 3 is beneficial.

It should be noted that the Limit I in FIG. 3 is based on the SNR in receive RF bandwidth W3, while the Limit II in FIG. 3 is based on the SNR after de-spreading has been performed on the signal S 206.

Figure 5:
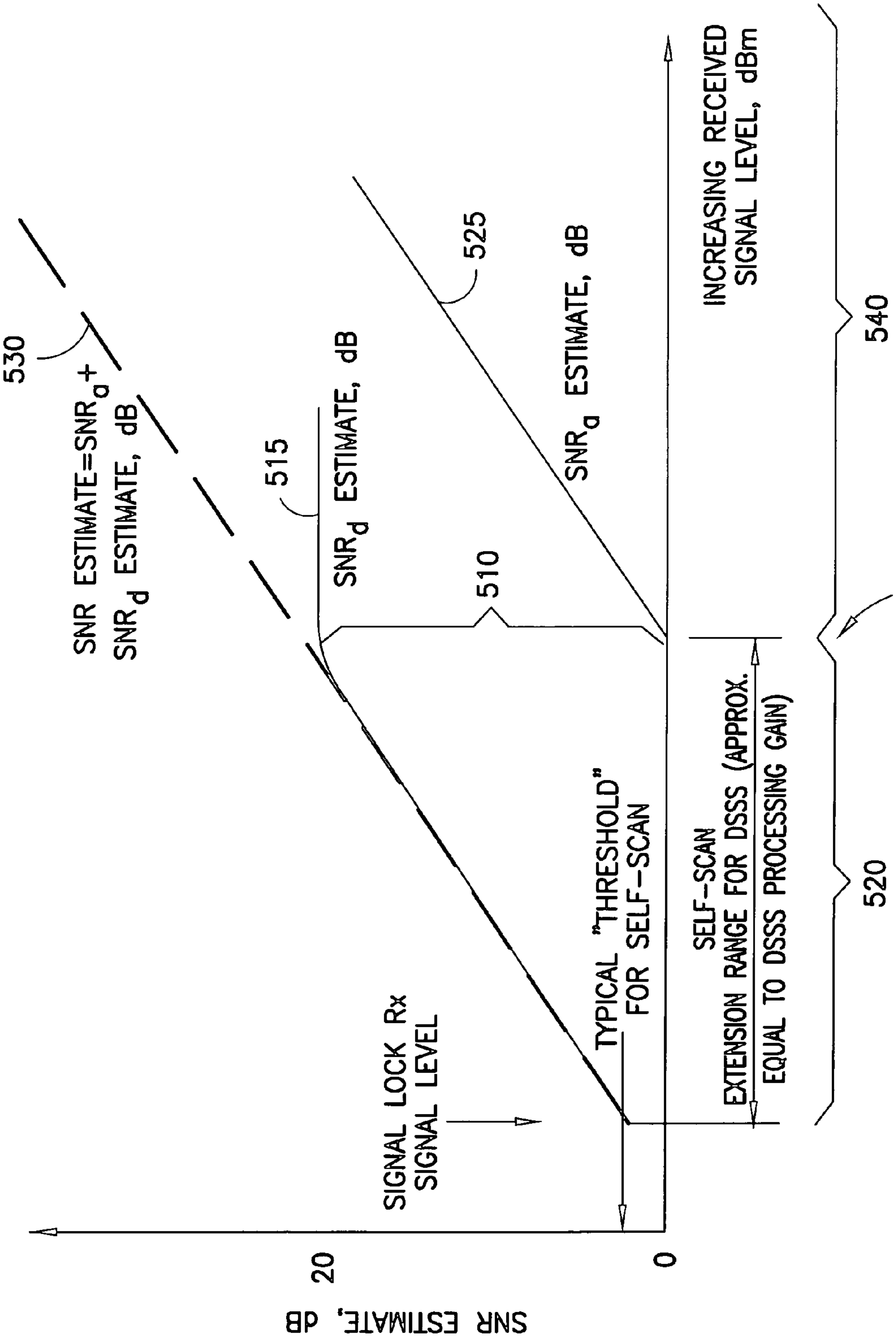
FIG. 5 is a graph of an exemplary combined estimate SNR.

FIG. 5 illustrates a combined estimate SNR 530 that combines the estimated $SNR_d$ signal 515 (e.g., a curve defined by values for estimated $SNR_d$ signal 245) and the estimated $SNR_a$ signal 525 (e.g., a curve defined by values for estimated $SNR_a$ signal 280 that are determined from the AGC output voltages 260 shown in FIG. 3) to provide a tracking metric over the extended signal range to include, for instance, the low SNR (in receive RF bandwidth W3) DSSS signaling case (signal range 520) and for the large SNR signaling case (signal range 540). This is an improvement over U.S. Pat. No. 6,433,736, which relates generally to signal range 540. The application of estimated $SNR_d$ signal 515 or a combined SNR 530 to the self-scan tracking algorithms may be determined in, for instance, software depending on the characteristics of the received signal (DSSS or non-spread signals, and processing gain of the received DSSS signal).

Typically, both the estimated $SNR_a$ signal 525 and estimated $SNR_d$ signal 515 will be used (e.g., summed) all of the time, although this is not necessary. Even non-spread signals with forward error correction coding operate at very low SNRs in the receive RF bandwidth W3, albeit typically not negative SNRs. If the estimated $SNR_d$ signal 515 term becomes large (e.g., 20-25 dB or so), then the contribution to the combined SNR 530 by the estimated $SNR_a$ signal 525 will be non-negligible. If the SNR in receive RF bandwidth W3 is small, the estimated $SNR_a$ signal 525 will not tend to vary significantly and the estimated $SNR_d$ signal 515 will predominate. By summing (e.g., by the enhanced search and self-scan tracking algorithm module 285) the estimated $SNR_a$ signal 525 and the estimated $SNR_d$ signal 515, the combined estimate SNR 530 is obtained that covers all Region I, II, and III conditions for FIGS. 3 and 4. It should be noted that the value 510 can be added to the estimated $SNR_a$ signal 525, e.g. during a scaling operation, when the combined SNR is above the predetermined SNR 535.

FIG. 5 illustrates an exemplary case where the combined estimated SNR 530 is linear and monotonic. In practice, it is only important that the combined estimated SNR 530 be monotonic with increased signal strength (e.g., as determined in the receive RF bandwidth W3 and after de-spreading), with the exact characteristic of AGC response versus signal level being of secondary importance. The self-scan tracking algorithm of U.S. Pat. No. 6,433,736 is primarily searching for a signal change rather than an absolute signal level.

In FIG. 5, the combined estimate SNR 530 may be determined by adding the estimated $SNR_d$ signal 515 to the estimated $SNR_a$ signal 525. The estimated $SNR_a$ signal 525 is determined by converting AGC output voltage 260 to an estimated SNR. Converting the AGC output voltage 260 to an estimated $SNR_a$ signal 525 may be performed though techniques such as sign inversion and scaling. Scaling is done appropriately to provide a monotonic increasing combined estimated SNR 530 as shown in FIG. 5. For instance, in an exemplary embodiment, scaling is performed to provide a combined estimated SNR 530 that is approximately linear in "dB" (see units of Y-axis in FIG. 5=dB). For example, if there is a change in AGC voltage level of one volt, this value for AGC voltage should be multiplied by a scale factor, say for example 30 dB/volt, to get a dB value of 1 volt×30 dB/volt=30 dB. Keep in mind that while the SNR in the receive RF bandwidth W3 may be negative, the estimated $SNR_d$ signal 245, determined after de-spreading the waveform for the signal S 206 (e.g., on the de-spread signal 237), is generally always positive. This is shown in FIG. 4—note the "Signal Lock Rx Signal Level" arrow location and the positive values that follow the arrow location. When the signal is locked, the estimated $SNR_d$ signal 245 will be positive in the exemplary embodiment of FIG. 4. Prior to lock, estimated $SNR_d$ signal 245 is generally set to zero. The estimated $SNR_d$ signal 245 is never negative as shown in FIG. 4. It should be noted that FIGS. 3-5 are merely exemplary and changes could be made therein. For instance, the AGC output voltage 260 could be negative, as could the estimated $SNR_a$ signal 280. The estimated $SNR_a$ signal 280 could also be made negative, such that the combined estimate SNR 530 would be negative.

Typically, AGC output voltages 260 below a predetermined threshold are assigned a value for the estimated $SNR_a$ signal 280 of zero. Values for the combined estimate SNR 530 are used in a self-scan tracking algorithm, as described in FIG. 6. In another embodiment, a "modified" estimated $SNR_a$ signal that is used in the self-tracking algorithm can include a value 510 plus the estimated $SNR_a$ signal 525. This is explained in reference to FIG. 7.

Figure 6:
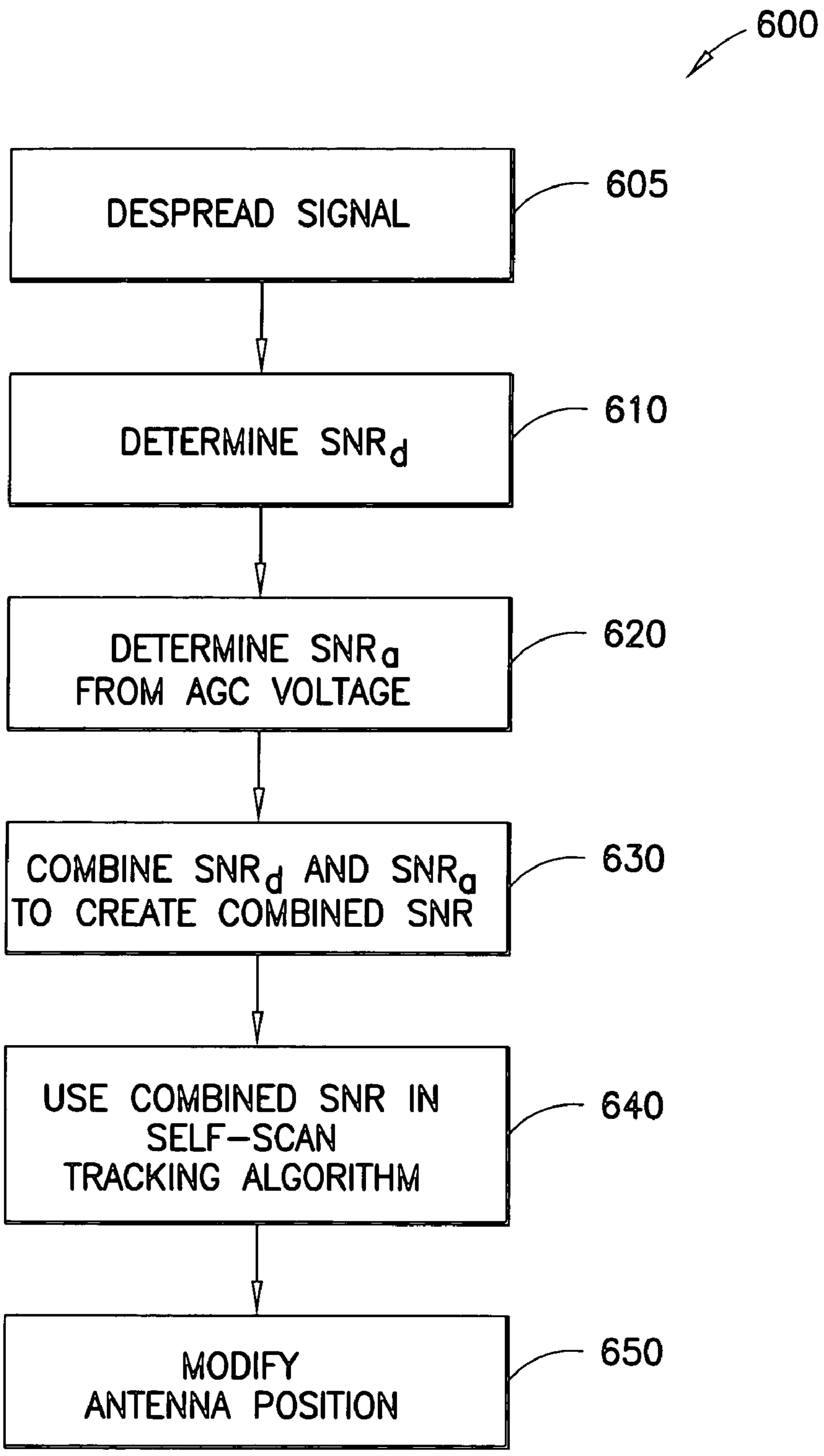
FIG. 6 is a flowchart of an exemplary method for enhanced self-scan tracking.

FIG. 6 is a flowchart of a method 600 for enhanced self-scan tracking. Turning now to FIG. 6 with appropriate reference to FIG. 2, method 600 is typically performed by an antenna controller 290. In step 605, the signal S 206 is de-spread, typically by the correlation receiver 236. In step 610, a value for the estimated $SNR_d$ signal 245 is determined using the de-spread signal (e.g., de-spread signal 237). In step 620, a value for the estimated $SNR_a$ signal 280 is determined using the AGC voltage. In step 630, the values for the estimated $SNR_d$ signal 245 and estimated $SNR_a$ signal 280 are combined (e.g., typically added, although there may be some mapping involved) to create a combined SNR (e.g., combined SNR 530 of FIG. 5) The combined SNR is an output SNR suitable for use to determine one or more control signals (e.g., the antenna search and self-scan control signal(s) 207) suitable for modifying a position of a directional antenna 205. In step 640, the combined SNR is used in a self-scan tracking algorithm such as that described in U.S. Pat. No. 6,433,736, although other algorithms may be used. The self-scan tracking algorithm (e.g., performed by the enhanced search and self-scan tracking algorithm module 285) determines one or more control signals (e.g., the antenna search and self-scan control signal(s) 207) suitable for modifying a position of a directional antenna 205. The one or more control signals are used to modify (if necessary) the position of the directional antenna 205 (step 650).

Figure 7:
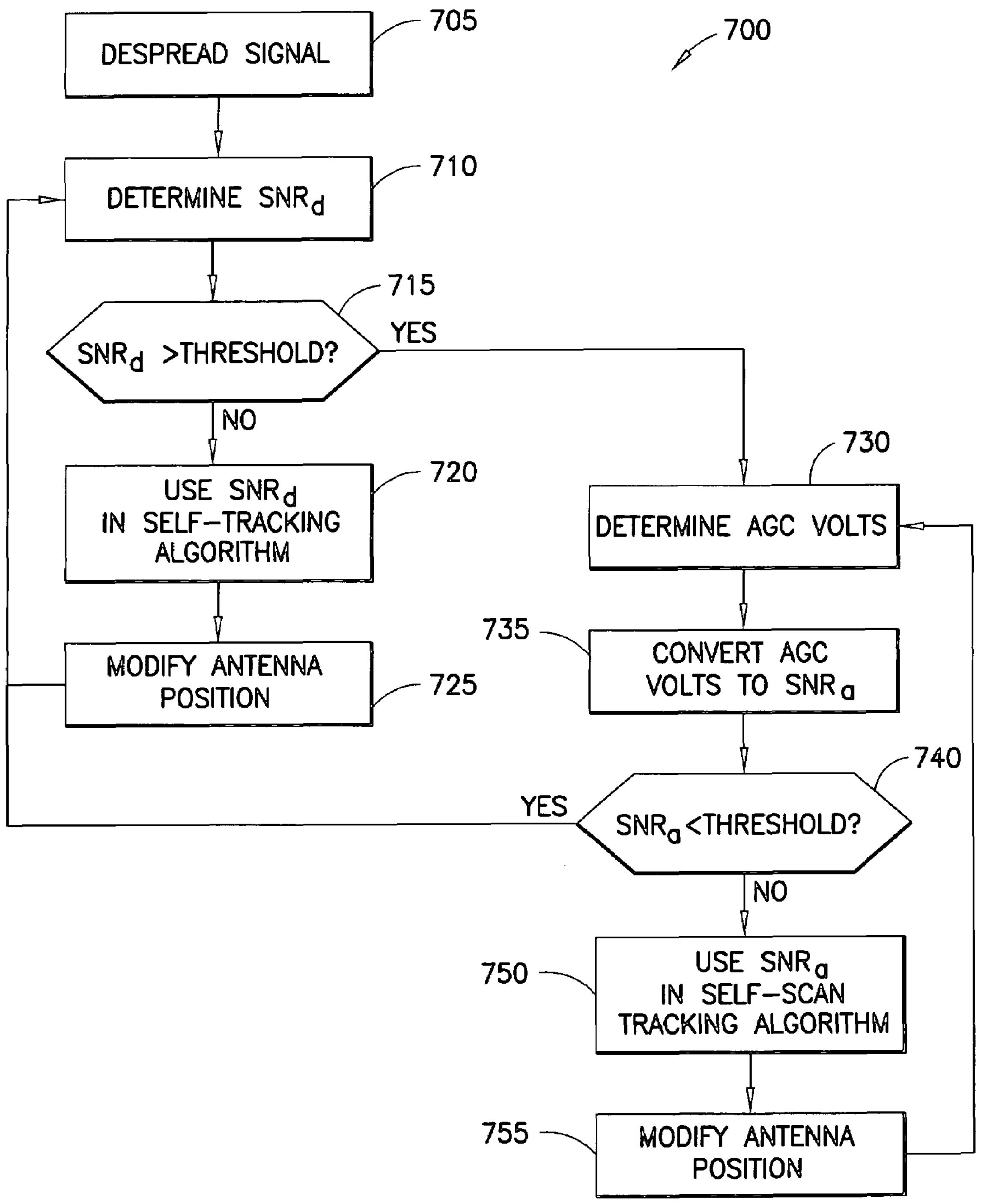
FIG. 7 is a flowchart of another exemplary method for enhanced self-scan tracking.

Turning now to FIG. 7 with appropriate reference to FIG. 2, a flowchart is shown of another exemplary method 700 for enhanced self-scan tracking. Method 700 is typically performed by an enhanced search and self-scan tracking algorithm module 285. In step 705, the signal S 206 is de-spread, typically by the correlation receiver 236. In step 710, a value for an estimated $SNR_d$ signal 245 is determined. In step 715, it is determined if the value is above a threshold for the estimated $SNR_d$ signal 245. If the value is not above the threshold (step 715=No), the value for the estimated $SNR_d$ signal 245, as an output SNR, is used in a self-scan tracking algorithm (step 720) and the position of the directional antenna 205 is modified, if necessary (step 725). The method 700 continues in step 710. Otherwise (step 715=YES), the method 700 continues in step 730. AGC voltage is determined in step 730. In step 735, the AGC voltage is converted to a modified estimated $SNR_a$ signal (e.g., as an output SNR), by adding a value 510 (see FIG. 5) to a value for an estimated $SNR_a$ signal 280. If the modified estimated $SNR_a$ signal is not less than a threshold (step 740=No), the modified estimated $SNR_a$ signal is used in a self-scan tracking algorithm in step 750 and the position of the directional antenna 205 is modified, if necessary (step 755). If the modified estimated $SNR_a$ signal is greater than a threshold (step 740=Yes), the method 700 continues in step 710. Depending on implementation, the value 510 need not be added and instead an unmodified estimated $SNR_a$ signal 280 might be used.

Method 700 thus allows values to be used in a self-scan tracking algorithm without determining a combined SNR. This might be useful, for instance, if a combined SNR would have some overlap between the estimated $SNR_d$ signal 245 (e.g., see 515 in FIG. 5) and the estimated $SNR_a$ signal 280 (see 525 in FIG. 5) that could cause a non-monotonic combined SNR (e.g., 530 of FIG. 5).

It should be noted that the various blocks of the flow diagrams of FIGS. 6 and 7 may represent program steps, interconnected circuits, or a combination thereof for performing the specified tasks. As another example, although the techniques in U.S. Pat. No. 6,061,339 have been described as being one way of determining the estimated $SNR_d$ signal 245, other suitable techniques may be used to determine an estimate of the SNR of a DSSS RF signal or a non-spread RF signal. The methods of FIGS. 6 and 7 may implemented through one or more circuits, where each circuit comprises one or more processors (e.g., digital signal processors), one or more memories, one or more logic arrays such as field programmable gate arrays, one or more semiconductor chips, software, or some combination thereof.

Thus, what has been shown are techniques to extend the tracking range of an existing self-scan tracking algorithm to include, for instance, DSSS signaling, where the received signal level is below the thermal noise level of the receiver. The extension range is on the order of the process gain of the DSSS signal (e.g., chipping rate divided by data rate). These techniques can provide significant cost benefits over present existing implementations that are hardware intensive since the mathematical calculations may be performed in software and/or in hardware such as inexpensive field programmable gate arrays (FGPAs) in a digital demodulator 235 and associated antenna controller 290. The techniques utilize the same antenna gimbals and control electronics that are already required to control and point the directional antenna.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. Nonetheless, all such and similar modifications of the teachings of this invention will still fall within the scope of this invention. For instance, although a monotonic combined SNR 530 is beneficial, the techniques of the present invention may be implemented with a non-monotonic combined SNR 530, depending on the design of the enhanced search and self-scan tracking algorithm module 285.

Furthermore, some of the features of the exemplary embodiments of this invention could be used to advantage without the corresponding use of other features. As such, the foregoing description should be considered as merely illustrative of the principles of the present invention, and not in limitation thereof.

What is claimed is:

1. A method comprising:

determining a first estimated signal to noise ratio (SNR) of a received radio frequency (RF) signal;

converting an output voltage of an AGC circuit coupled to the received RF signal to a second estimated SNR; and determining an output SNR using at least the first estimated SNR when the first estimated SNR is within a first range and using at least the second estimated SNR when the second estimated SNR is within a second range, the output SNR suitable to use to determine at least one control signal suitable to modify a position of a directional antenna.

2. The method of claim 1, further comprising determining using the output SNR the at least one control signal.

3. The method of claim 2, further comprising modifying the position of the directional antenna in response to the at least one control signal.

4. The method of claim 1, wherein:

the method further comprises de-spreading the RF signal to create a de-spread signal; and determining the first estimated SNR further comprises determining the first estimated SNR of the de-spread signal.

5. The method of claim 1, wherein both the first and second estimated SNRs are used when the first estimated SNR is within the first range and when the second estimated SNR is within the second range, and wherein determining an output SNR further comprises adding the first and second estimated SNRs to determine the output SNR.

6. The method of claim 5, wherein converting the output voltage of the AGC circuit further comprises performing at least one of scaling and sign inversion on values for voltages of the AGC circuit.

7. The method of claim 6, wherein performing further comprises performing at least one of scaling and sign inversion on values for the output voltage of the AGC circuit so that the output SNR is monotonic for at least a range of values of the output SNR.

8. The method of claim 7, wherein performing further comprises performing at least one of scaling and sign inversion on values for the output voltages of the AGC circuit so that the output SNR is monotonic and linear for at least a range of values of the output SNR.

9. The method of claim 1, wherein determining an output SNR further comprises:

in response to the first estimated SNR being less than a predetermined threshold, selecting the first estimated SNR as the output SNR, wherein the first range comprises values of the first estimated SNR from a predetermined low value of the first estimated SNR to the predetermined threshold.

10. The method of claim 9, wherein the predetermined threshold is a first predetermined threshold, and determining the output SNR further comprises:

in response to the second estimated SNR being greater than a second predetermined threshold, determining the output SNR by setting a value for the output SNR equal to a predetermined value added to the second estimated SNR, wherein the second range comprises values of the second estimated SNR from the second predetermined threshold to a predetermined high value of the second estimated SNR.

11. The method of claim 10, wherein the first and second predetermined thresholds are the same value.

12. The method of claim 1, embodied at least in part by a program of machine-readable instructions on a signal bearing medium.

13. The method of claim 1, wherein determining an output SNR further comprises:

in response to the second estimated SNR being greater than a predetermined threshold, selecting the second estimated SNR as the output SNR, wherein the second range comprises values of the second estimated SNR from the second predetermined threshold to a predetermined high value of the second estimated SNR.

14. An apparatus comprising:

a circuit that determines a first estimated signal to noise ratio (SNR) of a radio frequency (RF) signal;

a circuit that converts an output voltage of an automatic gain control (AGC) circuit coupled to the RF signal to a second estimated SNR; and a circuit that determines an output SNR using at least the first estimated SNR when the first estimated SNR is within a first range and using at least the second estimated SNR when the second estimated SNR is within a second range, the output SNR suitable to use to determine at least one control signal suitable to modify a position of a directional antenna.

15. The apparatus of claim 14, further comprising a circuit that determines using the output SNR the at least one control signal.

16. The apparatus of claim 15, further comprising at least one gimbal that modifies the position of the directional antenna in response to the at least one control signal.

17. The apparatus of claim 14, wherein:

the apparatus further comprises a correlation receiver that de-spreads the RF signal to create a de-spread signal; and the circuit that determines the first estimated SNR further determines the first estimated SNR using the de-spread signal.

18. The apparatus of claim 14, wherein both the first and second estimated SNRs are used when the first estimated SNR is within the first range and when the second estimated SNR is within the second range, and wherein the circuit that determines an output SNR adds the first and second estimated SNRs to determine the output SNR.

19. The apparatus of claim 18, wherein the circuit that converts performs at least one of scaling and sign inversion on values for voltages of the AGC circuit.

20. The apparatus of claim 19, wherein the circuit that converts performs at least one of scaling and sign inversion on values for the output voltage of the AGC circuit so that the output SNR is monotonic for at least a range of values of the output SNR.

21. The apparatus of claim 20, wherein the circuit that converts performs at least one of scaling and sign inversion on values for the output voltages of the AGC circuit so that the output SNR is monotonic and linear for at least a range of values of the output SNR.

22. The apparatus of claim 14, wherein the circuit that determines an output SNR, in response to the first estimated SNR being less than a predetermined threshold, selects the first estimated SNR as the output SNR, wherein the first range comprises values of the first estimated SNR from a predetermined low value of the first estimated SNR to the predetermined threshold.

23. The apparatus of claim 22, wherein the predetermined threshold is a first predetermined threshold, and the circuit that determines the output SNR, in response to the second estimated SNR being greater than a second predetermined threshold, determines the output SNR by setting a value for the output SNR equal to a predetermined value added to the second estimated SNR, wherein the second range comprises values of the second estimated SNR from the second predetermined threshold to a predetermined high value of the second estimated SNR.

24. The apparatus of claim 23, wherein the first and second predetermined thresholds are the same value.

25. The apparatus of claim 14, wherein the circuit that determines the output SNR, in response to the second estimated SNR being greater than a predetermined threshold, selects the second estimated SNR as the output SNR, wherein the second range comprises values of the second estimated SNR from the second predetermined threshold to a predetermined high value of the second estimated SNR.

26. An apparatus comprising:

means for determining a first estimated signal to noise ratio (SNR) of a received radio frequency (RF) signal;

means for converting an output voltage of an AGC circuit coupled to the received RF signal to a second estimated SNR; and means for determining an output SNR using at least the first estimated SNR when the first estimated SNR is within a first range and using at least the second estimated SNR when the second estimated SNR is within a second range, the output SNR suitable to use to determine at least one control signal suitable to modify a position of a directional antenna.

* * * * *